US006545089B1

(12) United States Patent
DeRudder et al.

(10) Patent No.: US 6,545,089 B1
(45) Date of Patent: *Apr. 8, 2003

(54) IMPACT MODIFIED CARBONNATE POLYMER COMPOSITION HAVING IMPROVED RESISTANCE TO DEGRADATION AND IMPROVED THERMAL STABILITY

(75) Inventors: James L. DeRudder, Mt. Vernon, IN (US); Robert R. Gallucci, Mt. Vernon, IN (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,650

(22) Filed: Sep. 4, 1997

(51) Int. Cl.[7] .............................................. C08G 63/48
(52) U.S. Cl. ............................. 525/63; 525/67; 525/69; 525/902
(58) Field of Search ............................. 525/67, 69, 63, 525/902

(56) References Cited

U.S. PATENT DOCUMENTS

| 4,145,374 A | 3/1979 | Narducy et al. |
| 4,997,883 A | 3/1991 | Fischer et al. |
| 5,066,717 A | 11/1991 | Eichenauer et al. |
| 5,451,624 A | 9/1995 | Memon et al. |

FOREIGN PATENT DOCUMENTS

| EP | 0 154 244 A2 | 9/1985 |
| EP | 0 186 917 A2 | 7/1986 |
| EP | 0 266 596 A2 | 5/1988 |
| EP | 0 272 425 A2 | 6/1988 |
| EP | 0 315 867 A2 | 5/1989 |
| EP | 0 326 938 A2 | 8/1989 |
| EP | 0 390 146 A1 | 10/1990 |
| EP | 0 394 781 A2 | 10/1990 |
| EP | 0 780 438 A2 | 6/1997 |
| WO | WO 91/18052 | 11/1991 |

OTHER PUBLICATIONS

EPO Abstract for JP 06228422, Aug. 1994.*
ACS (HCAPLUS) Abstract for JP 50085651, Jan. 1975.*
Derwent (WPI) Abstract for JP 09087465, Mar. 1997.*
Derwent (WPI) Abstract for JP 50067355, Jun. 1975.*
European Search Report for Application No. EP 98 30 7149.

* cited by examiner

Primary Examiner—Edward J. Cain

(57) ABSTRACT

An aromatic carbonate polymer composition having improved thermal stability consisting of an aromatic carbonate polymer such as a polycarbonate or polycarbonate/polyester blend and an impact modifier which is free of alkali materials which catalytically degrade a polycarbonate. Also an impact modifier which is preferably of a shell-core structure prepared by the emulsion polymerization process and has a pH of about 3 to about 8. A preferred emulsifier is an alkyl sulfonate having an alkyl group of C6–C18 carbons.

24 Claims, No Drawings

IMPACT MODIFIED CARBONNATE POLYMER COMPOSITION HAVING IMPROVED RESISTANCE TO DEGRADATION AND IMPROVED THERMAL STABILITY

FIELD OF THE INVENTION

The present invention is directed to an impact modified thermoplastic aromatic carbonate polymer composition having improved resistance to transesterification or degradation and improved thermal stability. More specifically the composition of this invention comprises in combination an aromatic polycarbonate resin and an impact modifier that essentially does not catalyze transesterification or degradation of an aromatic carbonate polymer composition.

BACKGROUND OF THE INVENTION

Addition of rubbery impact modifiers is commonly used to improve the toughness of aromatic carbonate polymer compositions. In comparing the effectiveness of various rubbery modifiers large differences in melt stability are often observed. In aromatic carbonate polymer compositions, the polycarbonate portion of the composition is susceptible to degradation by acids-and bases. Sufficient degradation will cause color formation, loss of molecular weight, reduced chemical and mechanical properties and generation of carbon dioxide which causes surface appearance defects, such as splay in molded parts.

The problem of the melt stability of polycarbonates and blends thereof with other polymers are often addressed by the addition of various stabilizers as disclosed in copending application Ser. No. 08/79112 filed Jan. 30, 1997 and assigned to the same assignee and in U.S. Pat. Nos. 4,532, 290, 5,252,536, 5,441,997, 5,502,119 and 5,608,027 all of which are incorporated herein by reference. Rubbery modifiers prepared by emulsion polymerization are useful in polymer blends as impact modifiers due to their fixed particle size. However, they may cause particular problems in the stability of polycarbonates due to the presence of significant amounts of additives employed in preparing the rubbery modifiers such as flow aids, polymerization catalysts, antioxidants and especially emulsifiers. Some of the most common impact modifiers employed in the preparation of a carbonate polymer compositions are polymers themselves prepared by: polymerization techniques employing particular emulsifiers that are utilized in emulsion polymerization reactions; suspension agents utilized in suspension polymerization reactions; surfactants utilized in phase transfer catalysis systems; soluble catalysts utilized in polymerization reactions; and for certain process stabilizers employed during the processing of the polymers either in the polymerization or in the molding thereof. For example, it is now known that residues in an impact modifier from these particular polymerization aids, particularly emulsion polymerization aids employed in preparing certain impact modifiers, quite often catalyze transesterification or degradation of polycarbonates. It is also known that impact modifier additives to carbonate polymer compositions are commonly made by emulsion polymerization processes employing alkali metal salts of fatty acid emulsifiers to stabilize the emulsion during polymerization of the impact modifier. It is also known that the alkali metal salts of fatty acids catalyze transesterification or degradation of polycarbonates which in turn causes inconsistent thermal stability in carbonate polymer composition because of residual amounts of the emulsifier employed in preparing the modifier remaining in the impact modifier. This leads to problems in molding shops because of the variability in viscosity due to the catalytic transesterification or degradation of polycarbonates with such impact modifiers.

U.S. Pat. No. 5,608,027 Table 11 describes the superior performance of complex stabilization systems when impact modifiers are used in polycarbonate compositions and demonstrates problems that can occur with reaction between the polycarbonate and the impact modifier, if complex stabilizers are not added to prevent the reaction.

A large number of patents exists describing the use of additives in polycarbonate compositions. A significant fraction of these are directed to the use of impact modifiers. The instant invention discloses the utilization of certain impact modifiers prepared by emulsion polymerization in carbonate polymer compositions, which impact modifiers are essentially free of particular residual emulsifiers that cause degradation of polycarbonates. The instant invention is directed to an impact modified carbonate polymer composition with better thermal stability than compositions with conventional impact modifiers which employ, for example, alkali metal salts of fatty acid as emulsifiers in the preparation thereof.

SUMMARY OF THE INVENTION

It has now been found that the basic cause of many melt instability issues in impact modified carbonate polymer composition and blends thereof with polyesters is the presence of residual amounts of certain emulsifiers such as alkali metal salts of fatty acids employed in preparing impact modifiers. Alkali metal carboxylates are especially troublesome.

Surprisingly, it has now been discovered that degradation of a polycarbonate is not seen when employing certain surfactants selected from sulfate, sulfonate or phosphate based ionic surfactants in preparing impact modifiers, particularly rubbery modifiers, by the emulsion polymerization process even though the same alkali metal ion may be present. Use of a sulfonate, sulfate or phosphate type surfactant allows preparation of a rubbery modifier by an emulsion polymerization process that even though containing residual amounts of the emulsifier in the carbonate polymer composition, does not result in significant polycarbonate degradation.

Sulfate, sulfonate or phosphate surfactants allow flexibility in the preparation of rubbery modifiers by emulsion polymerization techniques. They do not require acidification of the rubber (which could cause acid catalyzed degradation of polycarbonates or its blends) nor do they require extensive washing or other purification steps to reduce residual surfactant levels in the rubbery modifier. Since these surfactants do not as readily degrade polycarbonates, they can be left in the rubbery modifier.

Thus, this invention is directed to an impact modified aromatic carbonate polymer composition having improved stabilization to degradation or transesterification and improved thermal stability. It has been surprisingly discovered, for example, that when methylmethacrylate-butadiene styrene (MBS) impact modifiers are prepared using certain sulfonates, sulfates or phosphates as surfactants, the carbonate polymer compositions impact modified with such MBS impact modifiers have significantly improved melt and thermal stability. It is also preferred that the impact modifier have a pH of about 3–8. The general invention is directed to the improvement of the melt and thermal stability of polycarbonates by going backward in the process of making the impact modifiers that are utilized in the polymer. Specifically for carbonate polymer compositions, the impact modifier should be essentially free of such residual amounts of emulsifiers as alkali metal salts of fatty acids, alkali metal carbonates, and other basic materials, such as amines or ammonium salts. Some examples of such emulsifiers are metal salts of stearic acid such as sodium stearate, lithium stearate and the like, metal salts of oleic acid such as sodium and potassium oleate and the like, amines such as dodecyl dimethyl amine, dodecyl amine and the like, and ammonium salts thereof. On the other hand, when certain surfactants are utilized in preparing impact modifiers of this invention with polycarbonate containing compositions such as MBS impact modifiers, little or no degradation of the polycarbonate is noted. These surfactants are selected from the group of ionic surfactants consisting of alkyl or arylalkyl sulfonates, alkyl or alkylaryl sulfates, and alkyl or alkylaryl phosphates.

Therefore, it is an object of the invention to provide an impact modified polycarbonate composition having improved resistance to degradation.

Another object of this invention is to provide an impact modifier essentially free of basic materials such as alkali metal salts of fatty acids, alkali metal carbonates and other basic material such as amines and ammonium salts.

DETAILED DESCRIPTION OF THE INVENTION

The instant invention is directed to a novel impact modifier which when employed in a carbonate polymer composition, the carbonate polymer composition has improved thermal stability by having improved resistance to degradation from the catalytic effect on the polycarbonate component of the composition due to the impact modifier being essentially free of certain emulsifiers. It was discovered that certain impact modifiers, prepared by emulsion polymerization, cause catalytic degradation of the polycarbonate. As such, degradation reduces the molecular weight of the polycarbonate thereby affecting physical, chemical and mechanical properties, including melt viscosity and processing.

In an emulsion polymerization process, such certain emulsifiers commonly employed are alkali metal salts of fatty acids. Alkali metal carbonates, or other basic materials may also be used. Such emulsifiers of the prior art are typically as set forth previously.

In preparing the impact modifiers with the above commonly employed emulsifiers, it has been found that residual amounts of the emulsifier can remain in the impact modifier. The amount of residual emulsifier depends on the method of recovering the impact modifier. Spray drying of the impact modifier usually results in a higher amount of emulsifier remaining. If salt coagulants or acid coagulants are employed in obtaining the final impact modifiers, more of the residual emulsifier maybe removed by the coagulant process, but sufficient amount of the emulsifier may still remain.

Applicant's have now surprisingly discovered that by employing an impact modifier that is essentially free of certain emulsifiers in preparing an impact modifier by the emulsion polymerization process, an impact modifier is obtained which when employed in a carbonate polymer composition does not catalytically degrade the polycarbonate component of the composition even though some of the surfactant may remain in the impact modifier. The preferred surfactant for the emulsion polymerization process for preparing the impact modifiers of this invention are ionic surfactants comprising alkyl or alkylaryl sulfonates, alkyl or alkylaryl sulfates, alkyl or alkylaryl phosphates, or mixtures thereof. Examples of such surfactants include, but not limited thereto, sodium dodecyl benzene sulfonate, potassium octyl benzene sulfonate, sodium lauryl sulfate, sodium alkyl naphthyl sulfonates, calcium decyl benzene sulfonate, C8–C16 alkylated diphenylether sodium disulfonates, potassium hexyl phosphate, sodium decylphosphate, and mixtures thereof, and the like. Preferably the alkyl is an aliphatic hydrocarbon group of 6–30 carbon atoms and may be aryl substituted. The aryl groups are an organic radical derived from an aromatic hydrocarbon and may comprise 1 to 3 substituted phenyl rings. The preferred ionic surfactants are alkyl sulfonates.

The critical feature of the instant invention is that the impact modifier must be essentially free of alkali metal salts of fatty acids, alkali metal carbonates and other basic processing aids that would degrade a polycarbonate if residual amounts remained in the impact modifier. However, when employing the surfactants disclosed in the instant invention, residual quantities remaining in the impact modifier do not substantially degrade a polycarbonate when such impact modifiers are employed in a carbonate polymer composition.

Polycarbonates useful in preparing carbonate polymer compositions as disclosed in this invention are generally aromatic polycarbonates. Typically these are prepared by reacting a dihydric phenol with a carbonate precursor, such as phosgene, a haloformate or a carbonate ester and generally in the presence of an acid acceptor and a molecular weight regulator. Generally speaking, such carbonate polymers may be typified as possessing recurring structural units of the formula:

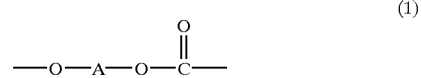

(1)

wherein A is a divalent aromatic radical of the dihydric phenol employed in the polymer reaction. The dihydric phenol which may be employed to provide such aromatic carbonate polymers are mononuclear or polynuclear aromatic compounds, containing as functional groups two hydroxy radicals, each of which maybe attached directly to a carbon atom of an aromatic nucleus. Typical dihydric phenols are: 2,2-bis(4-hydroxyphenyl)propane; hydroquinone; resorcinol; 2,2-bis(4-hydroxyphenyl)pentane; 2,4'-(dihydroxydiphenyl)methane; bis(2-hydroxyphenyl)methane; bis(4-hydroxyphenyl)methane; 1,1-bis(4-hydroxyphenyl)-3,3,5-trimethylcyclohexane; fluorenone bisphenol, 1,1-bis(4-hydroxyphenyl)ethane; 3,3-bis(4-hydroxyphenyl)pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethy-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, Spiro biidane bis phenol and the like.

These aromatic polycarbonates can be manufactured by known processes, such as, for example and as mentioned above, by reacting a dihydric phenol with a carbonate precursor, such as phosgene, in accordance with methods set forth in the literature including the melt polymerization process. Generally in the melt polymerization process, a diphenyl carbonate is reacted with a bisphenol.

The carbonate precursor employed in preparing the polycarbonate of this invention can be either carbonyl halide or a haloformate. The carbonyl halides which can be employed herein are, for example carbonyl bromide, carbonyl chloride, etc.; or mixtures thereof. The haloformates suitable for use herein include bishaloformates of dihydric phenols. (bischloroformates of bis phenol A, hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

The reaction disclosed above is preferably known as an interfacial process or reaction between the dihydric compound and a carbonyl chloride such as phosgene. Another process for preparing the aromatic polycarbonate employed in this invention is the transesterification process which involves the transesterification of an aromatic dihydroxy compound and a diester carbonate. This process is known as the melt polymerization process. In the practice of this invention, the process of producing the aromatic polycarbonate is not critical. The critical feature of this invention is the composition of the aromatic carbonate polymer with the particular impact modifier disclosed herein. As used herein, aromatic carbonate polymer shall mean and include any of the aromatic polycarbonates, polyester carbonates or combinations thereof.

It is also possible to employ two or more different dihydric phenols or a copolymer of a dihydric phenol with a glycol or with a hydroxy- or acid-terminated polyester or with a dibasic acid or hydroxy acid in the event a carbonate copolymer or interpolymer rather than a homopolymer is desired for use in the preparation of the polycarbonate mixtures of the invention. Polyarylates and polyestercarbonate resins or their blends can also be employed. Branched polycarbonates are also useful and are well disclosed in the literature. Also, blends of linear polycarbonate and a branched polycarbonate can be utilized herein. Moreover, blends of any of the above materials may be employed in the practice of this invention to provide the aromatic polycarbonate component of the carbonate polymer composition.

In any event, the preferred aromatic polycarbonate for use in the practice in the present invention is a homopolymer, e.g., a homopolymer derived from 2,2-bis(4-hydroxyphenyl) propane (bisphenol-A) and phosgene, commercially available under the trademark designation LEXAN® Registered TM of General Electric Company.

The polycarbonates are preferably high molecular weight aromatic polycarbonate having an intrinsic viscosity, as determined in chloroform at 25° C. of from about 0.3 to about 1.5 deciliters per gram (dl/gm), preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise polyfunctional organic compounds containing at least three functional groups which may by hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl) isopropyl)benzene),tris-phenol PA (4(4(1,1-bis(p-hydroxyphenyl)-ethyl)alpha, alpha-dimethyl benzyl) phenol), 4-chloroformyl phthalic anhydride, trimesic acid and benzophenone tetracarboxylic acid. The branching agent may be added at a level of about 0.05–2.0 weight percent.

All types of polycarbonates end groups are contemplated as being within the scope of the present invention with respect to the polycarbonate component of a carbonate polymer composition.

In the practice of this invention and as used herein, carbonate polymer compositions include polycarbonates and blends of polycarbonates polymers with polyesters, such as polyalkylene phthalates. A preferred blend is a composition of an aromatic polycarbonate and a polyalklylenephthalate (polyester) preferably a polyalkyleneterephthalate such as polybutyleneterephthalate (PBT), polyethyleneterephthalate (PET), or polypropyleneterephthalate (PPT) with PBT being most preferred.

Polyesters include those comprising structural units of the following formula:

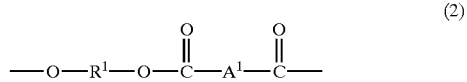

(2)

wherein each $R^1$ is independently a divalent aliphatic, alicyclic or aromatic hydrocarbon or polyoxyalkylene radical, or mixtures therof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid had been incorporated. Furthermore, it is sometime desirable to have various concentrations of acid and hydroxyl end groups on the polyester, depending on the ultimate end-use of the composition.

The $R^1$ radical may be, for example, a C2–C10 alkylene radical, a C6–20 alicyclic radical, a C6–20 aromatic radical or a polyoxyalkylene radical in which the alkylene groups contain about 2–6 and preferably 2 or 4 carbon atoms. The $A^1$ radical in the above formula is most often p- or m-phenylene, naphthalene, a cycloaliphatic or a mixture thereof. This preferred class of polyester includes the poly (alkylene terphthalates).

Examples of aromatic dicarboxylic acids represented by the dicarboxylated residue $A^1$ are isophthalic or terphthalic acid, 1,2-di(p-carboxyphenyl)ethane, 4,4'-dicarboxydiphenyl ether, 4,4'bisbenzoic acid and mixtures thereof. Acids containing fused rings can also be present, such as in 1,4- 1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terphthalate) ("PPT"), polycyclohexanedimethanol terephthalate (PCT) and mixtures thereof.

Also contemplated herein are the above polyesters with minor amount, e.g., from about 0.5 to about 10 percent by weight, of units derived from aliphatic acid and/or aliphatic polyols to make copolyesters.

Blends of an aromatic polycarbonate and a polyester comprise blends of about 10 to about 90 weight % of an aromatic polycarbonate and correspondingly about 90 to about 10 weight % of a polyalkylenephthalate. Preferably, the blend composition comprises about 30 to about 70 weight % of an aromatic polycarbonate and correspondingly, about 70 to about 30 weight % of a polyester. The weight % is based on the total weight of the polycarbonate and polyalkylenephthalate. The preferred polyalkylenephthalate is a polyalkyleneterephthalate and more particularly a polybutyleneterephthalate.

The rubbery impact modifiers that may be blended with PC maybe vinyl aromatic, alkylacrylate, methacrylate or vinylnitrile resins which comprise (a) rubber modified monovinylidene aromatic graft copolymer and/or (b) an ungrafted copolymer, and are generally prepared by emulsion graft polymerization of a mixture of a monovinylidene monomer and one or more comonomers in the presence of one or more rubbery polymeric substrates. Depending on the amount of rubber present, a separate matrix or continuous phase of ungrafted rigid (co) polymer may be simultaneously obtained along with the rubber modified monovinylidene graft polymer. Typically, the rubber modified resins comprise the rubber modified graft copolymer at a level of from 40 to 95 percent by weight based on the total weight of the resin, preferably from 50 to 85 percent by weight thereof, more particularly 75 to 85 percent by weight thereof. The compatibilizing, graft polymer is present at a level of from 60 to 5 percent by weight based on the total weight of the resin, preferably from 15 to 50 percent by weight thereof, and more preferably from 15 to 25 percent by weight thereof.

Monovinylidene aromatic monomers which may be employed include styrene, α-methyl styrene, halostyrenes i.e. dibromostyrene, mono or di alkyl, alkoxy or hydroxy substituted groups on the nuclear ring of the monovinylidene aromatic monomer i.e. vinyltoluene, vinylxylene, butylstyrene, para-hydroxystyrene or methoxystyrene or mixtures thereof. The monovinylidenearomatic monomers utilized are generically described by the following formula:

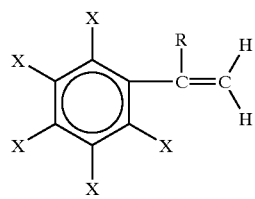

(3)

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbons atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstryrene.

Comonomers which may be used with the monovinylidene aromatic monomer includes acrylonitrile, methacrylonitrile, C1 to C8 alkyl or aryl substituted acrylate, C1 to C8 alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth) acrylates or mixtures thereof. The acrylonitrile, substituted acrylonitrile, or acrylic acid esters are described generically by the following formula:

(4)

wherein R is as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate.

The rubber modified graft copolymer preferably comprises (i) the rubber substrate, and (ii) a rigid polymeric superstrate portion grafted to the rubber substrate. The rubber substrate is preferably present in the graft copolymer at a level of from 40 to 95 percent by weight based on the total weight of the graft copolymer, more preferably from 50 to 85 percent by weight thereof, and most preferably 75 to 85 percent by weight thereof.

Examples of rubber polymers for the substrate include: conjugated dienes, copolymers of a diene with styrene, acrylonitrile, methacrylonitrile or C1 to C12 alkyl acrylate which contain at least 50% (preferably at least 65%) by weight % conjugated dienes, polyisoprene or mixtures thereof; olefin rubbers i.e. ethylene propylene copolymers (EPR) or ethylene propylene non-conjugated diene copolymers (EPDM); silicone rubbers; or C1 to C8 alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene which are produced by aqueous radical emulsion polymerization. The acrylate rubbers may be cross-linked, particulate emulsion copolymers substantially of C1–C8 alkylacrylate, in particular C4–C6-alkylacrylate, optionally in admixture with up to 15% by weight of comonomers such as styrene, methylmethacrylate, butadiene, vinyl methyl ether or acrylonitrile and optionally up to 5% weight of a polyfunctional crosslinking comonomer, e.g. divinyl-benzene, glycol-bis-acrylates, bisacrylatmides, phosphoric acid triallylester, citric acid triallyl-ester, allylesters or acrylic acid or methacrylic acid, triallylcyanurate, triallylisocyanurate. Also suitable are mixtures of diene- and alkylacrylate rubbers and rubbers which have a so-called core/shell structure, e.g. a core of a diene or acrylate rubber and a shell of an acrylate or styrene acrylonitrile.

Specific conjugated diene monomers normally utilized in preparing the rubber substrate of the graft or core shell polymer are generically described by the following formula:

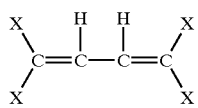
(5)

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion has a glass transition temperature (Tg) is equal to or less than about 0° C.

Mixtures of one or more rubbery polymers previously described for preparing the monvinylidene aromatic graft polymers, or mixtures of one or more rubber modified monovinylidene aromatic graft polymers disclosed herein may also be employed. Furthermore, the rubber may comprise either a block or random copolymer. The rubber particle size is not critical to this invention but maybe measured by simple light transmission methods or capillary hydrodynamic chromatography (CHDF) may be described as having an average particle size by weight of 0.05 to 1.2 microns, preferably 0.2 to 0.8 microns, for emulsion based polymerized rubber latices or 0.5 to 10 microns, preferably 0.6 to 1.5 microns, for mass polymerized rubber substrates which also have included grafted monomer occulsions. The rubber substrate is preferably a particulate, moderately cross-linked diene or alkyl acrylate rubber, and preferably has a gel content greater than 70%.

Preferred graft superstrates include copolymers of styrene and acrylonitrile, copolymers of α-methylstyrene and acrylonitrile, methylmethacrylate polymers or copolymers. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES). The most preferred are methacrylate butadiene styrene (MBS) and methylacrylate, butyl acrylate (acrylic rubber) such as graft copolymers or have a shell-core structure.

The ungrafted polymers (typically free of rubber) are resinous, thermoplastic polymers of styrene, α-methylstyrene, styrenes substituted in the nucleus such as para-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers, methylmethacrylate/acrylonitrile copolymers, polyaklylacrylates, polyacrylates or copolymers thereof are preferred.

The ungrafted rigid copolymers are known and may be prepared by radical polymerization, in particular by emulsion, suspension, solution or bulk polymerization. They preferably have number average molecular weights of from 20,000 to 200,000.

These rubber modified monovinylidene graft polymers may be polymerized either by mass, emulsion, suspension, solution or combined processes such as bulk-suspension, emulsion-bulk, bulk-solution or other techniques may be produced either by continuous, semibatch or batch processes, and are essentially free from alkali metal salts of fatty acids, alkali metal carbonates and other basic materials.

The instant invention is directed to a carbonate polymer composition comprising an aromatic carbonate polymer and an impact modifier wherein the impact modifier is free of basic materials such as alkali metal salts of fatty acids of C6–C30 carbon atoms, alkali metal carbonates and other basic materials such as amines or ammonium salts as disclosed previously. The impact modifier may be a shell-core structure having a rubbery core and thermoplastic shell or a graft rubber copolymer. The rubbery core is prepared by an emulsion polymerization process employing a surfactant selected from the group consisting of alkyl or alkylaryl sulfonates, alkyl or alkylaryl sulfates, alkyl or alkylaryl phosphates, substituted silicates and mixtures thereof as disclosed previously. The preferred surfactant is an alkly sulfonate having an alkyl group of C6–C16 carbon atoms and preferably C8–C12 carbon atoms.

In the practice of this invention, any impact modifier may be employed providing it is free of the alkali metal salts of fatty acids, alkali metal carbonates and other basic materials. Preferably, the impact modifier comprises a shell-core structure wherein the core is a rubbery material with a glass transition temperature ($T_g$) equal to or less than 0° C. and include such rubbery material as butyl rubber acrylates, polyolefins, siloxanes, polybutadienes, polyisoprenes, styrene butadiene rubbers, mixtures thereof, and the like. The shell is a thermoplastic polymer that is readily wet by the PC. The shell may merely physically encapsulate the core, or the shell may be partially or essentially completely grafted to the core. More specifically, the shell comprises a vinylaromatic compound and/or a vinylcyanide acid or an alkyl (meth) acrylate.

Olefin-containing copolymers such as olefin acrylates and olefin diene terpolymers can additionally be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the are and generally fall into the EPDM (ethylene propylene diene) family of terpolymers. Polyolefins such as polyethylene, polyethylene copolymers with alpha olefins are also of use in these compositions.

Additionally, styrene-containing polymers can also be used as impact modifiers. Examples of such polymers are styrene butadiene styrene (SBS), styrene ethylene butylene styrene (SEBS), and other high impact styrene-containing polymers (HIPS).

The emulsion polymerization process for preparing the impact modifier of this invention is not critical and is described and disclosed in various patents and literature of such companies as Rohm & Haas and General Electric Company. However, the critical feature of the instant invention is that the impact modifier must be essentially free of those emulsifiers set forth previously.

The carbonate polymer composition comprises in admixture a carbonate polymer and an impact modifier. The carbonate polymer may be a polycarbonate or a blend of a polycarbonate and a polyester as described previously. The composition comprises about 60 to about 99 weight % of a carbonate polymer and, correspondingly, about 40 to about 1 weight % of an impact modifier. Preferably the composition comprises about 75 to about 95 weight % and more particularly about 85 to about 95 weight % of a carbonate polymer and, correspondingly, about 25 to about 5 weight % and more particularly about 15 to about 5 weight % of an impact modifier. The weight % is based on the total weight of carbonate polymer and impact modifier.

In addition, this invention is also directed to an impact modifier which is essentially free of those emulsifiers as set forth above. The impact modifier preferably has a pH of about 3 to about 8 and preferably 4 to about 7.

DETAILED DESCRIPTION OF THE EXAMPLES OF THIS INVENTION

This invention can be further described by means of the following Examples; it being understood, however, that this invention shall in no way be restricted by these Examples. Where amounts are in terms of percent, they are percent by weight unless stated otherwise.

Example 1

Polycarbonate resin having an intrinsic viscosity of about 0.43 dl/g (deciliter per gram) as measured in methylene chloride at about 20° C. was extruded using a 130 mm W-P twin screw extruder with additives as set forth in TABLE 1 below. The extrudate was pelletized and dried at about 120° C. for about 2 hours. The dried pellets were then injection molded into test specimens wherein the barrel temperature of the injection molding machine varied from about 285° C. to about 300° C. Formulation A is a comparative formulation and Formulation 1 is a formulation of this invention. The test results obtained are in TABLE 1 as follows.

TABLE 1

| FORMULATION | A | 1 |
|---|---|---|
| Polycarbonate | 100 | 100 |
| Stabilizer (hindered phenol - aryl phosphite) | 0.39 | 0.39 |
| Mold Release (pentaerythritol tetra stearate) (PETS) | 0 | 0.1 |
| Impact Modifier 1 | 4 | — |
| Impact Modifier 2 | — | 4 |
| PROPERTIES | | |
| Tensile Elongation (%) | 33 | 54 |
| MVI @ 6 mins. 300° C. (ml/10 mins.) | 16.8 | 16.7 |
| MVI 18 mins. @ 300° C. (ml/10 mins.) | 21.5 | 18.8 |
| MVI Shift, (18-6 mins.)% | 28(%) | 13(%) |

Impact Modifier 1 is a shell-core MBS prepared by employing an alkali metal salt of a fatty acid emulsifier and having residual emulsifier.
Impact Modifier 2 is a shell-core MBS prepared by employing an alkyl sulfonate surfactant and having residual surfactant.

The results clearly show better melt stability (Formulation 1 compared to Formulation A) as evidenced by the reduction in melt volume index shift when residence time is increased from 6 minutes to 18 minutes in the barrel. The difference of about 50% reduction in melt volume index shift from 28% with Impact Modifier 1 versus 13% with Impact Modifier 2.

Example 2

Example 1 was repeated except that the formulations employed herein were as set forth in TABLE 2. Formulation B and C are comparative examples and Formulation 2 and 3 were formulations of this invention.

TABLE 2

| FORMULATION | B | 2 | C | 3 |
|---|---|---|---|---|
| Polycarbonate | 100 | 100 | 100 | 100 |
| Stabilizer | 0.6 | 0.6 | 0.6 | 0.6 |
| Mold Release (PETS) | 0.15 | 0.2 | | 0.1 |
| Impact Modifier 1 | 4 | | 4 | |
| Impact Modifier 2 | | 4 | | 4 |
| PROPERTIES | | | | |
| Tensile Elongation (%) | 75 | 99 | 70 | 86 |
| MVI, 6 mins. @ 300° C. (ml/10 mins.) | 17.6 | 16.9 | 17.9 | 19.2 |
| MVI, 18 mins. @ 300° C. (ml/10 mins.) | 18.9 | 16 | 18.9 | 18.9 |
| MVI Shift (18-6 mins)% | 7 | −5 | 6 | −2 |

Impact modifiers 1 and 2 are the same as employed in Table 1.
Same stabilizer and mold release as employed in Table 1 except stabilizer also contained a thioester.

Example 3

Example 1 was repeated except that a polycarbonate had an IV of about 0.46 dl/g and a 30 mm twin screw extruder was employed herein. Formulation D, E, F, G, and H (Table 3) are comparative formulations. Formulations 4–8 (Table 4) are formulations of this invention.

TABLE 3

| FORMULATION | D | E | F | G | H |
|---|---|---|---|---|---|
| Polycarbonate | 100 | 100 | 100 | 100 | 100 |
| Stabilizer | 0.39 | 0.39 | 0.39 | 0.39 | 0.39 |
| Carbon Black phr | 1.0 | 1.0 | 1.0 | 1.0 | 1.0 |
| Impact Modifier 1 | 4.0 | 4.0 | 4.0 | 4.0 | 4.0 |
| Mold Release (PETS) | — | 0.1 | 0.2 | — | — |
| Polyalphaolefin Mold Release | — | — | — | 0.1 | 0.2 |
| PROPERTIES | | | | | |
| MVI, 6 mins. @ 300° C. (ml/10 mins.) | 14.6 | 17.3 | 15.9 | 15.9 | 15.2 |
| MVI 18 mins. Preheat @ 300° C. (ml/10 mins.) | 15.5 | 19.3 | 17.9 | 18.1 | 18.0 |
| MVI Shift (18-6 mins.) % | 6 | 12 | 13 | 14 | 18 |

Same impact modifier 1 as employed in Table 1, Example A.
Same stabilizer and mold release as employed in Table 1, Example 1.
Carbon Black is 25% concentrate in a PC resin carrier.

TABLE 4

| FORMULATION | 4 | 5 | 6 | 7 | 8 |
|---|---|---|---|---|---|
| Polycarbonate IV-0.45 dl/g | 100 | 100 | 100 | 100 | 100 |
| Stabilizer | 0.39 | 0.39 | 0.39 | 0.39 | 0.39 |
| Carbon Black | 1.0 | 1.0 | 1.0 | 1.0 | 1.0 |
| Impact Modifier 2 | 4.0 | 4.0 | 4.0 | 4.0 | 4.0 |
| Polyalphaolefin Mold Release phr | — | — | — | 0.1 | 0.2 |
| Mold Release (PETS) phr | — | 0.1 | 0.2 | — | — |
| PROPERTIES | | | | | |
| MVI, 6 mins. @ 300° C. (ml/10 mins.) | 15.5 | 15.9 | 15.8 | 15.8 | 16.2 |
| MVI, 18 mins. | 16.4 | 15.7 | 15.9 | 16.7 | 16.5 |

TABLE 4-continued

| FORMULATION | 4 | 5 | 6 | 7 | 8 |
|---|---|---|---|---|---|
| Preheat @ 300° C. (ml/10 mins.) | | | | | |
| MVI Shift % (18-6 mins.) | 4 | −1 | 1 | 6 | 2 |

Impact Modifier 2 was same as in Table 1, Example 1.
Same stabilizer and mold release as in Table 3.
Same carbon black as in Table 3.

In comparing the results of TABLES 3 and 4, it is clearly shown that the polycarbonate composition with the impact modifier prepared with a non-fatty acid emulsifier namely an alkyl sulfonate (Impact Modifier 2), had significantly better melt stability as evidenced by the Modifier 2), had significantly better melt stability as evidenced by the lower shift in melt volume index (%) when the residence time was increased from 6 to 18 minutes (TABLE 4). Furthermore, the impact modifier of the prior art containing an alkali metal salt of a fatty acid (TABLE 3) interacts significantly with the polycarbonate resin showed worse performance as shown by MVI shift.

Example 4

A carbonate polymer blend composition was prepared consisting of a polycarbonate having an IV of about 0.55 dl/gr (measured as in Example 1) and a polybutylene terephthalate (PBT) having an IV of about 1.20 dl/gm in a 60/40 phenol tertrachloroethane solution by extruding the composition using a 30 mm twin screw vacuum vented extruder. The extrudate was pelletized and the pellets were observed for color. The results of comparative Formulation I and Formulation 9 of this invention were as follows:

TABLE 5

| FORMULATION | I | 9 |
|---|---|---|
| Polycarbonate | 45 | 45 |
| PBT | 45 | 45 |
| Impact Modifier 1 | 10 | |
| Impact Modifier 2 | | 10 |
| Pellet Color | Yellow | White |

Impact Modifiers 1 and 2 were the same as employed in Example 1.

While many modifications and variations of the present invention are possible in view of the foregoing specification, it is understood that they would fall within the scope of the appended claims.

What is claimed is:

1. An impact resistant carbonate polymer composition having improved thermal stability and improved resistance to polymer degradation comprising in admixture an aromatic polycarbonate and an impact modifier prepared by an emulsion polymerization process wherein the impact modifier is essentially free of basic compounds from the emulsion polymerization that catalytically degrade the aromatic polycarbonate.

2. the aromatic carbonate polymer composition of claim 1 wherein the impact modifier has a pH of about 3 to about 8.

3. The aromatic carbonate polymer composition of claim 2 wherein the impact modifier has a pH of about 4 to about 7.

4. The carbonate polymer composition of claim 1 wherein the impact modifier is essentially free of alkali metal salts of fatty acids of 6–30 carbon atoms.

5. The carbonate polymer composition of claim 1 comprising in admixture about 60 to about 99 weight % of a polycarbonate and, correspondingly, about 40 to about 1 weight % of impact modifier, said weight % being based on the total weight of a polycarbonate and impact modifier.

6. The carbonate polymer composition of claim 5 wherein the composition comprises about 75 to about 95 weight % of the polycarbonate and, correspondingly, about 25 to about 5 weight % of the impact modifier.

7. The aromatic carbonate polymer composition of claim 1 wherein the impact modifier has a shell-core structure said impact modifier being prepared employing a surfactant selected from the group consisting of alkyl sulfonates, alkylaryl sufonates, alkyl sulfates, alkylaryl sulfates, alkyl phosphate, and alkylaryl phosphates, and mixtures thereof.

8. The aromatic carbonate polymer composition of claim 1 wherein the impact modifier is a graft copolymer.

9. The composition of claim 7 wherein the core is a rubbery polymer having a glass transition temperature of 0° C. or less.

10. An impact resistant carbonate polymer composition having improved thermal stability and improved resistance to polymer degradation comprising in admixture an aromatic polycarbonate and an impact modifier prepared by an emulsion polymerization process wherein the impact modifier is essentially free of basic compounds from the emulsion polymerization that catalytically degrade the aromatic polycarbonate, wherein the impact modifier has a shell-core structure, said impact modifier being prepared employing a surfactant selected from the group consisting of alkyl sulfonates, alkylaryl sulfonates, alkyl sulfates, alkylaryl sulfates, alkyl phosphates and alkylarylphosphates, and mixtures thereof and wherein the core consists essentially of a diene rubber polymer selected from the group consisting of conjugated dienes, copolymers containing at least about 50 weight % of a conjugated diene, an olefin rubber, a silicone rubber, an alkyl arylate of C1 to C8 carbon atoms in the alkyl group, copolymers of alkyl acrylates with a styrene or butadiene, and mixtures thereof, and the shell is a thermoplastic polymer.

11. The composition of claim 10 wherein the shell is a methylmethacrylate copolymer.

12. The aromatic carbonate polymer composition of claim 7 wherein the surfactant is an alkyl sulfonate having an alkyl group of 6–18 carbon atoms.

13. The aromatic polymer composition of claim 12 wherein the alkyl group is 6–12 carbon atoms.

14. An impact resistant carbonate polymer composition having improved thermal stability and improved resistance to polymer degradation comprising in admixture an aromatic polycarbonate, a polyester, and an impact modifier prepared by an emulsion polymerization process wherein the impact modifier is essentially free of basic compounds from the emulsion polymerization that catalytically degrade the aromatic polycarbonate.

15. The composition of claim 14 wherein the polyester is a polyalkylenephthalate.

16. The composition of claim 15 wherein the polyalkylenephthalate is polybutyleneterephthalate.

17. The composition of claim 14 wherein the polyester is polyalkylenenaphthanoate.

18. The composition of claim 14 wherein the composition comprises about 10 to about 90 weight % of an aromatic polycarbonate and, correspondingly, about 90 to about 10 weight % of a polyester based on the total weight of aromatic polycarbonate and polyester.

19. A shell-core impact modifier prepared by an emulsion polymerization process comprising a rubbery core and a thermoplastic polymer shell, said shell-core impact modifier being essentially free of residual emulsion polymerization emulsifiers which catalytically degrade an aromatic polycarbonate.

20. The shell-core impact modifier of claim 19 wherein the impact modifier is prepared by a polymerization process employing a surfactant as a polymerization aid, said surfactant being selected from the group of surfactants consisting essentially of alkyl sulfonates, alkylaryl sulfonates, alkylaryl sulfates, alkyl phosphates, alkylaryl phosphates, and mixtures thereof.

21. The shell-core impact modifier of claim 20 wherein the core is a rubbery butadiene-styrene copolymer and the shell is a methyl methacrylate-styrene polymer.

22. The carbonate polymer composition of claim 1, wherein the aromatic polycarbonate is a polyester carbonate.

23. A method for preparing an impact modified aromatic carbonate polymer composition, comprising the steps of:
   (a) preparing an impact modifier using a method comprising an emulsion polymerization process, wherein the method results in an impact modifier that is essentially free of residual basic compounds from the emulsion polymerization that catalytically degrade aromatic polycarbonates; and
   (b) combining the impact modifier prepared in step (a) with an aromatic polycarbonate polymer in an amount effective to increase the impact resistance of the aromatic polycarbonate polymer to form an impact-modified aromatic polycarbonate polymer, wherein the impact-modified aromatic polycarbonate polymer has a greater thermal stability than an impact-modified polymer formed from the same aromatic polycarbonate polymer and the same impact modifier, but including residual polymerization aids.

24. The method of claim 23, wherein the emulsion polymerization process is carried out using a surfactant selected from the group consisting of alkyl sulfonates, alkylaryl sulfonates, alkyl sulfates, alkylaryl sulfates, alkyl phosphates and alkylarylphosphates, and mixtures thereof.

* * * * *